H. P. Garabedian,
Pipe Coupling.

N° 84,875.    Patented Dec. 15, 1868.

Witnesses.
William C. Bodin
John Weir

Inventor.
Hachadoor P. Garabedian
per Francis D. Pastorius.
Attorney

UNITED STATES PATENT OFFICE.

HACHADOOR P. GARABEDIAN, OF PHILADELPHIA, PENNSYLVANIA.

Letters Patent No. 84,875, dated December 15, 1868.

IMPROVEMENT IN PIPE-COUPLINGS.

The Schedule referred to in these Letters Patent and making part of the same.

*To all whom it may concern:*

Be it known that I, HACHADOOR P. GARABEDIAN, of the city and county of Philadelphia, and State of Pennsylvania, have invented a new and improved Coupling for Hose, Steam, and Water-Pipes, &c.; and I do hereby declare that the following is a full, clear, and exact description of the same, reference being had to the accompanying sheet of drawings, and to the letters of reference marked thereon.

My invention relates to a coupling for hose and other pipes or tubes of soft metal or material.

The ends of the hose or pipes to be coupled are first connected by a tube, which takes into both. A conical-slotted tube, having a screw formed on its outer surface, is next passed on the hose, immediately over the place of contact of the ends. A nut is then screwed on this slotted tube, which shrinks it, and compresses the ends of the hose on the inserted tube, thereby forming a perfectly tight joint.

On reference to the accompanying sheet of drawings, making part of this specification—

Similar letters refer to similar parts in the several views.

Figure 2:
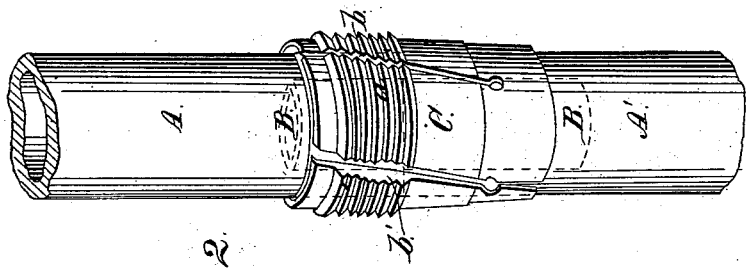
Figure 2 shows the sections of hose, the coupling-pipe, and the conical-slotted screw-tube.

A A' are sections of hose, which are coupled by my invention, as follows:

An inner tube, B, as shown in dotted lines, fig. 2, is inserted into the adjacent ends of the sections, which are afterward brought into contact.

A screw-slotted collar, C, is passed on the sections, immediately over the place of contact of the ends, which is constructed as follows:

Its bore is perfectly cylindrical, to correspond with the surface of the hose, while its outer surface has a conical screw, $a$, formed on it. As shown, it does not extend the length of the collar, but only so much of it as is necessary to its proper working.

The collar has a number of inclined slots, $b$, cut through it, one of which, $b'$, is cut its entire length; the others, $b$, are only cut a proportionate distance, so that the collar be a whole, and not be composed of several parts.

Figure 1:
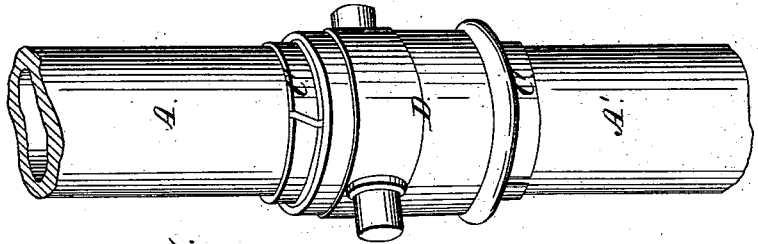
Figure 1 shows the coupling and hose complete.

D, fig. 1, is a nut, which takes over the screw-collar C. It has a screw formed in its bore, corresponding to the screw on the collar, with the exception that, while both screws have the same pitch, the screw on the collar is conical, and the screw formed in the bore of the nut is cylindrical.

It will be readily seen that the nut D, when being screwed on the cone-screw $a$, forces the edges of the slots $b$ together, thereby binding the collar on the hose. The pressure of the collar compresses the hose firmly on the inner tube B, and forms a perfectly tight joint or connection.

The nut D is formed with a cylindrical screw, to more easily and effectually close the collar. If it had a conical screw, corresponding with the screw $a$ its entire length, it would wedge on it, and fail to operate the collar.

What I claim as my invention, and desire to secure by Letters Patent, is—

The collar C, with its conical screw $a$, and the inclined slots $b$ $b'$, in combination with the nut D and the tube B, substantially as shown and described.

In testimony whereof, I hereunto sign my name to this specification, in presence of two subscribing witnesses.

HACHADOOR P. GARABEDIAN.

Witnesses:
FRANCIS D. PASTORIUS,
JOHN WHITE.